Nov. 8, 1938.         W. H. PRATT         2,136,251
VOLT-AMPERE-HOUR METER
Filed Oct. 7, 1937

Inventor:
William H. Pratt,
by Harry E. Dunham
His Attorney.

Patented Nov. 8, 1938

2,136,251

UNITED STATES PATENT OFFICE 2,136,251

VOLT-AMPERE-HOUR METER

William H. Pratt, Lynn, Mass., assignor to General Electric Company, a corporation of New York Application October 7, 1937, Serial No. 167,753

5 Claims. (Cl. 171—264)

My invention relates to volt-ampere hour meters and its object is to provide a relatively inexpensive but reliable meter of reasonable accuracy for measuring volt-ampere hours for circuits on which the range of power factor variation is known. In carrying my invention into effect I provide a meter having at least two induction driving elements which meter is actuated in accordance with the sum of the torques of the driving elements. These driving elements have their voltage coils supplied in parallel and their current coils supplied in series from the circuit to be metered. The different driving elements are adjusted to give maximum torques at different power factors. However, the sum of their torques is substantially proportional to volt-amperes over the range of power factor for which the meter is designed.

Figure 1:
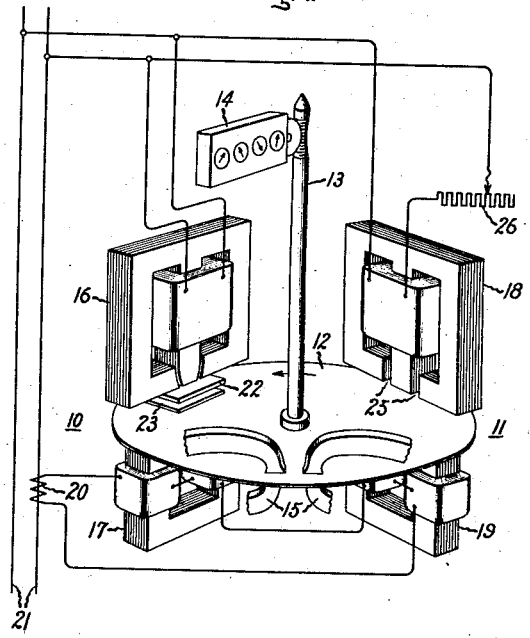
Figure 2:
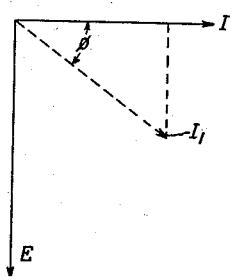
Figure 3:
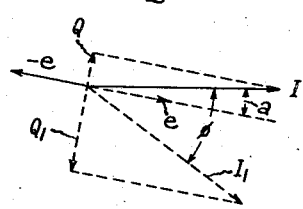

The features of my invention which are believed to be novel and patentable will be pointed out in the claims appended hereto. For a better understanding of my invention reference is made in the following description to the accompanying drawing in which Fig. 1 represents a perspective view of the essential parts of a single-phase volt-ampere hour meter as connected to a circuit to be metered thereby and Figs. 2 and 3 are vector diagrams of the current and voltage phases of the two driving meter elements of Fig. 1 showing what occurs with varying power factor.

It is well known that in the induction type of watt-hour meter maximum torque occurs for given values of voltage and current fluxes when said fluxes are 90 degrees out of phase. Usually the induction watt-hour meter has its voltage electromagnet of such high effective reactance and low resistance that the flux produced thereby lags 90 degrees behind the impressed voltage. A lag coil or plate contributes to this 90 degree relation and serves as a means of exact adjustment. The current flux is in phase with the current so that the 90 degree relation of current and voltage fluxes thus exists when the current and voltage of the circuit being metered are in phase or when the power factor of the circuit is unity.

One of the induction meter driving elements of my meter may be considered to be of the character just described although I do not limit my invention to having the current and voltage fluxes of such driving element exactly 90 degrees time phase apart at unity power factor.

The other induction meter driving element of the volt-ampere hour meter is arranged to have its current and voltage fluxes as near 180 degrees apart in time phases as practicable at unity power factor. This may be accomplished by using a voltage electromagnet of low reactance and connecting considerable resistance in its energizing winding so as to bring its current substantially in phase with its energizing voltage and likewise substantially in phase with the current in the current electromagnet of this driving element and then reversing the connections of the voltage energizing winding.

When both of the driving elements are connected to the same power circuit the positive torque of one decreases while the positive torque of the other increases with a change in lagging power factor. Then by properly relating their torque constants the total torque may be made very closely proportional to volt-amperes over a considerable range of power factor.

As shown in Fig. 1 my volt-ampere hour meter employs two induction watt-hour meter driving elements 10 and 11 preferably although not necessarily operating on the same armature disc 12. One of these elements 10 is usually adjusted as a watt-hour meter, i. e., its voltage flux lags behind the current flux by 90 degrees when the power factor of the circuit is unity. The second driving element 11 does not have the quadrature flux phase relation and moreover, in the usual case, its voltage coil is reversed as compared to the voltage coil of driving element 10 so that its voltage flux may be considered to lead the current flux by an angle which is considerably in excess of 90 degrees at unity power factor. Then as the power factor becomes less than unity and is lagging the torque of this second driving element 11 will increase while that of the first element 10 will decrease.

The meter torque is the sum of the torques of the two driving elements and remains substantially proportional to volt-amperes over a considerable power factor range. The meter shaft is indicated at 13, the register at 14 and the damping magnets, partially broken away, at 15.

Meter element 10 comprises the voltage electromagnet 16 and current electromagnet 17. Meter element 11 has a voltage electromagnet 18 and current electromagnet 19. The current electromagnets may be similar and their coils are connected in series with the secondary of the current transformer 20 having its primary traversed by the current in the circuit 21. The voltage electromagnets are not identical. Electromagnet 16 is a standard watt-hour meter potential electromagnet having a lag plate indicated at 22 and a light load plate indicated at 23. Electromagnet 18 has no lag plate and need not have a light load plate. It has a lower inductance magnetic circuit by reason of increased width of air gap at the points 25 than does electromagnet 16. The resistance of its coil circuit is increased by means of a non-inductive resistance 26 which is preferably adjustable. The coil circuits of these voltage electromagnets are connected in parallel to the line 21 but the coil of electromagnet 18 is reversed with respect to the coil of electromagnet 16.

The difference between the two driving meter elements so far as operation is concerned may be explained by aid of the vector diagrams of Figs. 2 and 3. In Fig. 2 E represents the voltage flux vector and I the current flux vector of driving element 10 at unity power factor. It is noted that the voltage flux lags the current flux by 90 degrees and under these conditions the torque of element 10 will be a maximum. In Fig. 3, I represents the current flux of driving element 11. It has the same value and phase position as the current flux in element 10. In Fig. 3 the dotted line arrow $e$ would represent the voltage flux of element 11 had it not been reversed and $-e$ represents the voltage flux as reversed. Considering this voltage flux as before reversal it has a smaller value than E, Fig. 2, for reasons that will appear later. Owing to the absence of a lag plate, the presence of the non-inductive resistance 26 and the enlarged air gap at 25 the effective inductance of this voltage electro-magnet 18 is insufficient to lag the flux thereof 90 degrees. The angle of lag is that corresponding to angle $a$, which for calculating purposes may be considered 10 degrees when the power factor of the circuit is unity. Now when this flux is reversed to $-e$ it may be considered to lag the current flux by $180+a$ or to lead the current flux by $(180-a)$ degrees when the power factor of the metered circuit 21 is unity. It will be understood that the vectors thus far described are for a given in-phase current and voltage of circuit 21.

Under this condition the torque of element 10 is $EI$ and the torque of element 11 is $-e$ times that component of $I$ which is in quadrature $= eI \sin a = eQ$ in Fig. 3.

In Fig. 2 the current flux leads the voltage flux while in Fig. 3 the voltage flux may be considered to lead the current flux at unity power factor so that the torque represented by $EI$, in Fig. 2, and $eI \sin a = eQ$, Fig. 3, are reversed and the meter torque is then $EI - eI \sin a$ or considering that $\sin a$ in this case has a negative sign the meter torque $$T = EI + (-eI \sin a) \qquad (I)$$

When the line current lags behind the line voltage corresponding to some power factor $\cos \phi$ the torque of meter element 10 reduces to the value $EI \cos \phi$. This is represented in Fig. 2 where the line current has shifted $\phi$ degrees in a lagging direction to the position indicated by dotted line $I_1$.

In meter element 11 this power factor causes the current vector $I$ to shift to dotted line position $I_1$ also. It is evident that as the current vector shifts from position $I$ to position $I_1$, in Fig. 3, the negative torque of this meter element first reduces to zero as the quadrature component Q reduces to zero when $\phi = a$ and then reverses and increases until the reversed quadrature component becomes $Q_1$. The torque is then $$eI \sin (\phi - a) = IQ_1$$

in Fig. 3 and the total meter torque becomes $$T_1 = EI \cos \phi + eI \sin (\phi - a) \qquad (II)$$

This is the general torque equation for all angles of $\phi$ including unity power factor equation (I) because in equation (I) where $\phi = 0$, $\cos \phi = 1$ and $\sin (\phi - a) = -\sin a$.

The voltage flux vector $e$ or $-e$ is proportional to E and thus $e = E$ times a constant C.

Thus $$e = EC$$

Substituting EC for $e$ in this general torque equation (II)

$$T_1 = EI \cos \phi + EIC \sin (\phi - a)$$
$$= EI [\cos \phi + C \sin (\phi - a)]$$

Now it can be shown and it will be shown that if the proper value is taken for C the quantity $[\cos \phi + C \sin (\phi - a)]$ remains substantially constant over an appreciable range of power factor or value of $\phi$ and that therefore over such range of power factor the meter will measure volt-amperes or $EI$ within a satisfactory degree of accuracy. Let it be assumed that the power factor of power circuit 21 Fig. 1 varies between 90 and 100 per cent and we desire to measure the volt-amperes of this circuit by the meter of Fig. 1. Let it be further assumed that the angle $a$, Fig. 3, of this meter is 10 degrees and that we use the value .2 for C. Then for different power factor 100 and 90 the torque variation may be found from the following table—

| $\phi$ | Cos $\phi$ | $(\phi-a)$ | Sin $(\phi-a)$ | C sin $(\phi-a)$ | Cos $\phi$ + C sin $(\phi-a)$ |
|---|---|---|---|---|---|
| | | Degrees | | | |
| 0 | 1.00 | −10 | −.174 | −.035 | .965 |
| 5 | .996 | −5 | −.087 | −.016 | .980 |
| 10 | .985 | 0 | .000 | .000 | .985 |
| 15 | .966 | 5 | .087 | .016 | .982 |
| 20 | .94 | 10 | .174 | .035 | .975 |
| 25 | .91 | 15 | .260 | .052 | .962 |

It is seen that there is a variation of only about 2 per cent in the expression $\cos \phi + C \sin (\phi - a)$ over this range of power factor and hence the meter will measure volt-amperes within such range of accuracy.

The constant $C = .2$ may be incorporated in the meter by reducing the voltage flux of element 11 as compared to element 10, by increasing the armature air gap for element 11 as compared to element 10 or by any other way or combination of ways so as to reduce the torque constant of element 11 as compared to element 10.

The invention is not limited to the power factor range, angle of $a$, and constant C used in the above illustration. For example, let us assume we desire a meter for measuring volt-amperes over a power factor range corresponding to variations in $\phi$ from 25 to 35 degrees, that angle $a$, Fig. 3, is reduced to zero in any suitable way, for example, by including a suitable condenser in the voltage winding of element 11 and we find that the value to be given C is .5.

When $a=0$ $(\phi-a)$ equals $\phi$ and the general torque equation may be simplified to $T_1 = EI (\cos \phi + C \sin \phi)$. Then our table for $(\cos \phi + C \sin \phi)$ for different values of $\phi$ between 25 and 35 degrees is as follows:

| $\phi$ | Cos $\phi$ | Sin $\phi$ | C (sin $\phi$) | (Cos $\phi$ + C sin $\phi$) |
|---|---|---|---|---|
| 25 | .906 | .423 | .212 | 1.112 |
| 30 | .865 | .5 | .250 | 1.115 |
| 35 | .818 | .573 | .287 | 1.110 |

It is seen that the error of volt-ampere measurement in the meter of the last illustration is less than 1 per cent over a range of power factor between .818 and .90.

Where it is required to cover a range of power factor variation which is too great to be covered with accepted accuracy by one such meter, it will be desirable to use two meters designed to measure volt-amperes over different selected power factor ranges and have the one which is the most accurate at any given instance operate a common register in the manner shown in Fig. 1 and explained in my United States Letters Patent No. 1,530,322, March 17, 1925.

In accordance with the provisions of the patent statutes, I have described the principle of operation of my invention together with the apparatus which I now consider to represent the best embodiment thereof but I desire to have it understood that the apparatus shown is only illustrative and that the invention may be carried out by other means.

What I claim as new and desire to secure by Letters Patent of the United States, is:

1. A volt-ampere-hour-meter comprising a rotatively mounted armature of conducting material, a pair of induction meter driving elements operating on said armature, said elements having voltage electromagnets connected in parallel but reversed with respect to each other and having current electromagnets connected in series, one of said elements producing a torque on said armature which decreases with a given decrease in power factor and with the other of said elements producing a resultant torque on said armature in the same direction which increases with such a decrease in power factor, the torque constants of said two meter elements being such that the resultant torque of both elements remains substantially proportional to volt-amperes over a considerable range of power factor variation.

2. In combination with a single phase alternating current circuit the power factor of which varies over a given range, a meter for measuring the volt-amperes of said circuit comprising a rotatively mounted armature of conducting material, a pair of induction meter elements cooperating with said armature to produce induction meter torques thereon, said elements having voltage electromagnets connected to be energized in proportion to the voltage of said circuit and having current electromagnets connected to be energized in proportion to the current of said circuit, one of said meter elements having its voltage flux lag its current flux by 90 degrees and the other meter element having its voltage flux lag its current flux by approximately 180 degrees when the power factor of said circuit is unity, one meter element producing a torque on said armature in a given direction which decreases with a decrease in the power factor of said circuit and the other meter producing a resultant torque on said armature in the same direction which increases with such decrease in power factor, the torque constants of the two meter elements being so related that over said given range of power factor variation the resultant torque on said armature is substantially proportional to the volt-amperes of said circuit.

3. An induction volt-ampere-hour-meter comprising an armature of conducting material, a pair of induction meter elements cooperating with said armature to produce torque thereon, said meter elements having voltage electromagnets which are energized in parallel and current electromagnets which are energized in series, the current fluxes of said elements being in phase and the voltage flux of one element lagging its current flux by 90 degrees when the voltage flux of the other element lags its current flux by approximately 180 degrees whereby the torque of one meter element is substantially a maximum when the torque of the other element is substantially a minimum, the torque constants of said meter elements being different and so related that the sum of their torques is substantially proportional to volt-amperes over a selected range of lagging power factor variations.

4. A volt-ampere-hour-meter comprising a rotatively mounted armature of conducting material, a pair of induction meter driving electromagnetic elements operating on said armature, one of said elements being a watt-hour-meter element having voltage and current windings and the other element having voltage and current windings connected so as to be energized in proportion to the voltage and current windings respectively of the watt-hour-meter element, said other element having a voltage electromagnet whose flux is substantially in phase with its energizing voltage and substantially 180 degrees out of phase with the current flux of said element whereby the torque produced thereby is substantially a minimum when the torque of the watt-hour-meter driving element is a maximum and the torques of said elements in a given direction with respect to the armature vary oppositely over a given range of power factor variation, the torque constant of said other meter element being less than that of the watt-hour-meter element by an amount which causes the sum of their torques to be substantially proportional to volt-ampere hours over a selected power factor range.

5. A volt-ampere-hour-meter comprising a pair of induction meter driving elements each having voltage and current electromagnets, a common armature of conducting material on which both driving elements operate to produce torque, connections for energizing the voltage electromagnets in parallel and the current electromagnets in series, one of said driving elements producing a torque proportional to EI cos $\phi$ and the other element producing a torque in the same direction on said armature proportional to EI sin $\phi$ where E and I are the voltage and current respectively applied to the voltage and current electromagnets and $\phi$ is the phase angle between such current and voltage, the torque constants of said elements differing by a value C such that cos $\phi + C$ sin $\phi$ is substantially a constant over a considerable range of variation of $\phi$ whereby said meter is enabled to measure volt-ampere hours over such range of variation of $\phi$ with acceptable accuracy.

WILLIAM H. PRATT.